UNITED STATES PATENT OFFICE.

JAMES BADDILEY, ARNOLD SHEPHERDSON, HERBERT SWANN, JAMES HILL, AND LESLIE GORDON LAWRIE, OF MANCHESTER, ENGLAND, ASSIGNORS TO BRITISH DYESTUFFS CORPORATION LIMITED, OF MANCHESTER, ENGLAND.

DYEING ACETYL CELLULOSE OR FABRICS CONTAINING THE SAME AND NEW PRODUCTS FOR USE THEREIN.

No Drawing. Application filed October 19, 1925, Serial No. 63,546, and in Great Britain January 7, 1925.

In our Patent No. 1,534,019 we have shown that in dyeing acetyl silk, among all the protective colloids or dispersing agents available, the condensation products of naphthalene with formaldehyde in sulphuric acid solution or naphthalene sulpho acid with formaldehyde give the best results and enable new products, suitable for dyeing acetyl silk with the greatest simplicity, to be placed at the dyer's disposal. The new products referred to are obtained by thoroughly mixing together colouring matters having affinity for acetyl silk which are insoluble or nearly insoluble in water with the said naphthalene formaldehyde sulphuric acid condensation products and the requisite quantity of water. We have now found modifications or improvements on the said invention in two respects. In the first place we have found that the quantity of naphthalene formaldehyde sulphuric acid condensation product can be diminished very considerably as compared with the data given in the stated patent. Thus in Example 2 of Patent No. 1,534,019 the new dyestuff paste is made by mixing 10 parts of the dispersing agent as obtained in Example 1 with 1 part of a mono-azo dyestuff, that is, there are used according to this example 4 or 5 times the quantity of anhydrous dispersing agent to 1 part of dyestuff. We have found that the addition of such a large quantity of a dispersing agent as that specified in this example is not always necessary and that pastes can be obtained which give dyebaths in which thorough penetration of the silk can be obtained when much smaller quantities of the dispersing agent are employed, for example, less than 1 per cent of the dispersing agent in a paste containing 10 per cent of dyestuff. Thus a useful paste for dyeing acetyl silk can be made up from:—

10 parts amino-anthraquinone, ¼ parts of the dispersing agent, and 89¾ parts water.

A second modification of the patented process relates to the method of neutralizing the acid condensation mixture of formaldehyde and naphthalene sulpho acid. In Example 1 given in the stated patent, we partially neutralize a reaction mixture with caustic soda. We have found that these conditions need not be adhered to, but that a satisfactory dispersing agent is obtained by completely neutralizing the condensation mixture with ammonia, and this method of neutralization has proved in practice the simpest method and that it is advantageous to be able to prepare and transport the new pastes neutral rather than slightly acid.

We claim:—

1. The improvement in the process of dyeing acetyl silk which comprises using as dispersing agent for dye-stuffs substantially insoluble in water, a naphthalene formaldehyde sulphuric acid condensation product completely neutralized with ammonia and dyeing acetyl silk with the dispersion.

2. The improvement in the process of dyeing acetyl silk, using as dispersing agent a naphthalene formaldehyde sulphuric acid condensation product completely neutralized with ammonia, which comprises using said product in a quantity less than 1 per cent in a paste containing 10 per cent of dyestuff substantially insoluble in water.

3. In the dyeing of acetyl silk, intimately mixing substantially insoluble coloring matters having affinity for acetyl silk with a naphthalene formaldehyde sulphuric acid condensation product completely neutralized with ammonia, which condensation product is in quantity less than one per cent in a paste containing 10 per cent of dyestuff substantially insoluble in water and about 90 per cent water and dyeing acetyl silk therewith.

4. A dye paste for use in dyeing acetyl silk comprising a mixture of dyestuffs substantially insoluble in water and having affinity for acetyl silk with a naphthalene formaldehyde sulphuric acid condensation product completely neutralized with ammonia.

5. A dye paste for use in dyeing acetyl silk comprising a paste of a water insoluble dyestuff having affinity for acetyl silk said paste containing 10 parts dyestuff and about 90 parts water and to which has been added not more than one part of a naphthalene formaldehyde sulphuric acid condensation product completely neutralized with ammonia.

In testimony whereof we have hereunto affixed our signatures.

JAMES BADDILEY.
ARNOLD SHEPHERDSON.
HERBERT SWANN.
JAMES HILL.
LESLIE G. LAWRIE.